US009278631B2

(12) United States Patent
Ferraro et al.

(10) Patent No.: US 9,278,631 B2
(45) Date of Patent: Mar. 8, 2016

(54) INFANT RESTRAINT SYSTEM FOR JUVENILE SEAT

(71) Applicant: Cosco Management, Inc., Wilmington, DE (US)

(72) Inventors: Allan R Ferraro, Attleboro, MA (US);
Brian C Sundberg, Chester, NH (US);
Ward A Fritz, Westwood, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/489,194

(22) Filed: Sep. 17, 2014

(65) Prior Publication Data

US 2015/0076877 A1 Mar. 19, 2015

Related U.S. Application Data

(60) Provisional application No. 61/878,852, filed on Sep. 17, 2013, provisional application No. 61/968,132, filed on Mar. 20, 2014.

(51) Int. Cl.
*A47C 31/00* (2006.01)
*B60N 2/26* (2006.01)
*B60N 2/28* (2006.01)

(52) U.S. Cl.
CPC .............. *B60N 2/265* (2013.01); *B60N 2/2812* (2013.01); *B60N 2002/2815* (2013.01)

(58) Field of Classification Search
CPC .... B60N 2/2821; B60N 2/2812; B60N 2/286; B60N 2/265; B60N 2002/2815; B60R 22/105; A47D 15/006; A47D 13/025

USPC ......... 297/250.1, 219.12, 464–466, 485–486, 297/488

See application file for complete search history.

(56) References Cited

U.S. PATENT DOCUMENTS

| | | | | | |
|---|---|---|---|---|---|
| 3,834,376 | A | * | 9/1974 | Thum | 602/24 |
| 4,188,065 | A | | 2/1980 | Meeker | |
| 4,674,800 | A | * | 6/1987 | Ensign | 297/465 |
| 5,243,724 | A | | 9/1993 | Barnes | |
| 5,781,946 | A | * | 7/1998 | McEntire | B60N 2/6054 2/69 |
| 5,826,287 | A | * | 10/1998 | Tandrup | 5/655 |
| 5,897,164 | A | * | 4/1999 | Kagan et al. | 297/219.12 |
| 5,916,089 | A | | 6/1999 | Ive | |
| 5,950,261 | A | | 9/1999 | Hay et al. | |
| 5,956,767 | A | * | 9/1999 | Imm | 2/69.5 |
| 5,957,537 | A | | 9/1999 | Hoolahan | |
| 5,988,742 | A | * | 11/1999 | Stevens | 297/219.12 |
| 6,145,932 | A | | 11/2000 | Hamel-Nyhus et al. | |
| 6,205,600 | B1 | * | 3/2001 | Sedlack | 5/94 |
| 6,247,755 | B1 | | 6/2001 | Canna et al. | |
| 6,857,966 | B2 | | 2/2005 | Armbruster et al. | |
| 6,978,479 | B2 | | 12/2005 | Thach | |
| 7,748,780 | B2 | | 7/2010 | Sizemore | |
| 7,862,115 | B1 | | 1/2011 | Davis | |
| 8,118,364 | B2 | * | 2/2012 | Davis | A47D 15/006 128/869 |
| 8,191,188 | B2 | * | 6/2012 | Kaplan | A47D 15/008 2/69.5 |
| 8,251,457 | B2 | | 8/2012 | Britton et al. | |
| 9,049,946 | B1 | * | 6/2015 | Tyler | A47D 15/00 |
| 2004/0217633 | A1 | | 11/2004 | Kassai et al. | |
| 2011/0049950 | A1 | * | 3/2011 | Pereira | 297/219.12 |
| 2011/0179546 | A1 | | 7/2011 | Millette et al. | |

* cited by examiner

*Primary Examiner* — Beth Stephan
(74) *Attorney, Agent, or Firm* — Barnes & Thornburg LLP (57) ABSTRACT

An infant restraint is coupled to a juvenile seat to restrain an infant seated in the seat. The seat includes a seat bottom and a seat back.

22 Claims, 9 Drawing Sheets

INFANT RESTRAINT SYSTEM FOR JUVENILE SEAT

PRIORITY CLAIM

This application claims priority under 35 U.S.C. §119(e) to U.S. Provisional Applications Ser. No. 61/878,852, filed Sep. 17, 2013 and Ser. No. 61/968,132, filed Mar. 20, 2014, both of which are expressly incorporated by reference herein.

BACKGROUND

The present disclosure relates to a juvenile seat, and particularly to infant restraint systems for juvenile seats. More particularly, the present disclosure relates to infant seat pads for use with juvenile seats.

SUMMARY

A motion-inhibitor apparatus in accordance with the present disclosure includes a juvenile seat and a seat pad for the juvenile seat. The seat pad is adapted to be placed on the juvenile seat by a caregiver. In some illustrative embodiments, the juvenile seat is adapted to be used on a passenger seat in a vehicle while in other illustrative embodiments, the juvenile seat is adapted to be mounted on a swing frame for swinging movement about a horizontal swing axis.

In illustrative embodiments, the seat pad is configured to provide infant-swaddle restraint means for enveloping an infant reclined in, for example, a supine position in an infant-receiving space so that the shoulders, upper torso, legs, and feet of the infant are substantially covered to swaddle the infant. The juvenile seat includes a seat shell and a swaddle harness coupled to the seat shell and to the infant-swaddle restraint. The swaddle harness is configured to inhibit movement of the infant-swaddle restraint (and an infant received therein) relative to the seat shell while the infant-swaddle restraint is located on the seat shell.

In illustrative embodiments, the seat shell includes a seat bottom and a seat back extending upwardly from the seat bottom to form a basin in which the infant-swaddle restraint and an infant swaddled therein may be placed by a caregiver. The infant-swaddle restraint includes a backrest made of a pliable material to conform as needed to portions of the seat bottom and seat back in the basin formed in the seat shell. The swaddle harness comprises a tether that is arranged to interconnect the infant-swaddle restraint and the seat shell in some illustrative embodiments.

In illustrative embodiments, the infant-swaddle restraint of the motion-inhibitor apparatus also includes a top-opening bag sized to receive and cover at least the feet and legs of the infant swaddled in the infant-swaddle restraint. In some embodiments, the top-opening bag is defined by a one-piece blanket coupled to the backrest and a blanket fastener coupled to the backrest and the one-piece blanket. In other embodiments, the top-opening bag is defined by a multi-piece blanket comprising a right blanket portion pivotably coupled to an outer edge of a lower right-side portion of the backrest, a left blanket portion pivotably coupled to an outer edge of a lower left-side portion of the backrest, and a center fastener configured to provide means for selectively coupling the right blanket portion to the left blanket portion to form a foot-and-leg blanket that cooperates with a companion lower panel included in the backrest to form the top-opening bag.

In illustrative embodiments, the infant-swaddle restraint also includes a shoulder-and-upper-torso wrap comprising a left shoulder wing pivotably coupled to a left-side region of an upper panel portion of the backrest and a right shoulder wing pivotably coupled to a right-side region of the upper panel of the backrest. The left and right shoulder wings wrap around the shoulders and upper torso of an infant swaddled in the infant-swaddle restraint while the feet and legs of the swaddled infant remain covered by the foot-and-leg blanket provided below the left and right shoulder wings.

The shoulder-and-upper-torso wrap further includes a wing-and-blanket fastener configured to provide means for coupling the foot-and-leg blanket to each of the left and right shoulder wings to form an outer covering that cooperates with the backrest to form the infant-receiving space in the infant-swaddle restraint.

In one illustrative embodiment, the wing-and-blanket fastener of the shoulder-and-upper-torso wrap comprises a left segment coupled to the left shoulder wing, a right segment coupled to the right shoulder wing, and a center segment coupled to the center fastener and configured to mate with the left and right segments. In another illustrative embodiment, the wing-and-blanket fastener comprises a waist-restraint belt coupled to an upper portion of a one-piece single blanket and to the backrest, a first wing-restraint belt coupled to a free end of the left shoulder wing and to the backrest and configured to tether the left shoulder wing to a right-side portion of the lower panel included in the backrest, and a second wing-restraint belt coupled to a free end of the right shoulder wing and configured to tether the right shoulder wing to a left-side portion of the lower panel included in the backrest to cause the left and right shoulder wings to crisscross and overlap one another.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a motion-inhibitor apparatus in accordance with a first embodiment of the present disclosure showing that the apparatus includes a juvenile seat and an unoccupied infant-swaddle restraint placed in a basin formed in the juvenile seat and showing that the infant-swaddle restraint includes a backrest, a shoulder-and-upper-torso wrap including a left shoulder wing and a right shoulder wing, and a foot-and-leg blanket having left and right blanket portions and a center fastener therebetween and showing that the infant-swaddle restraint also includes a wing-and-blanket fastener comprising a right segment coupled to the right shoulder wing, a left segment coupled to the left shoulder wing, and a center segment coupled to the center fastener in the blanket and configured to mate with the left and right segments;

DETAILED DESCRIPTION

Figure 1:
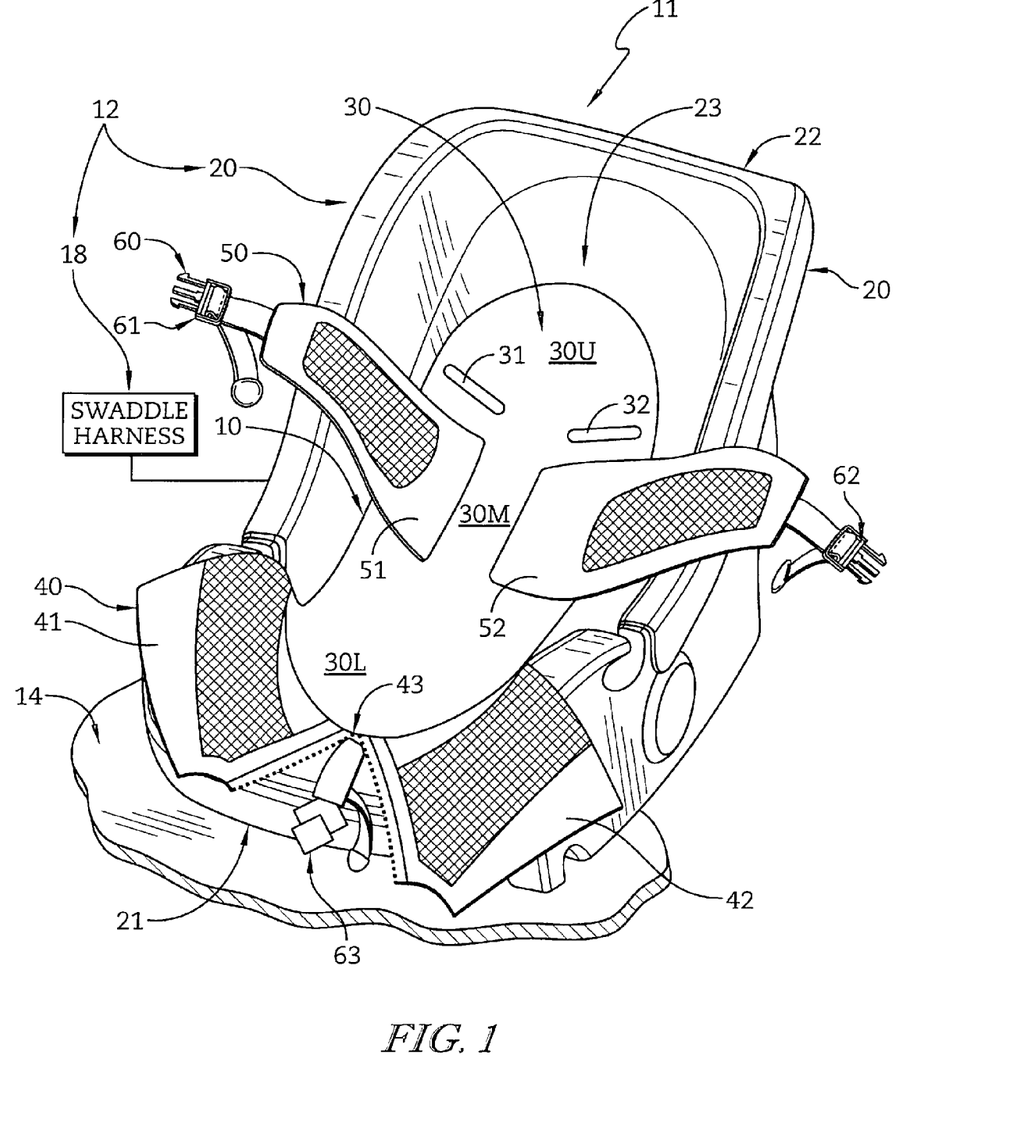

An infant-swaddle restraint 10 can be placed on a juvenile seat 12 that is adapted to be used on a passenger seat 14 of a vehicle as suggested in FIG. 1. After an infant 16 is swaddled in infant-swaddle restraint 10 having a multi-piece foot-and-leg blanket 40 as suggested in FIG. 2, a swaddle harness 18 included in juvenile seat 12 can be used to maintain the occupied infant-swaddle restraint 10 in a substantially stationary position on a seat shell 20 included in juvenile seat 12 to provide a motion-inhibitor apparatus 11 in accordance with a first embodiment of the present disclosure as suggested in FIG. 3.

Figure 4:
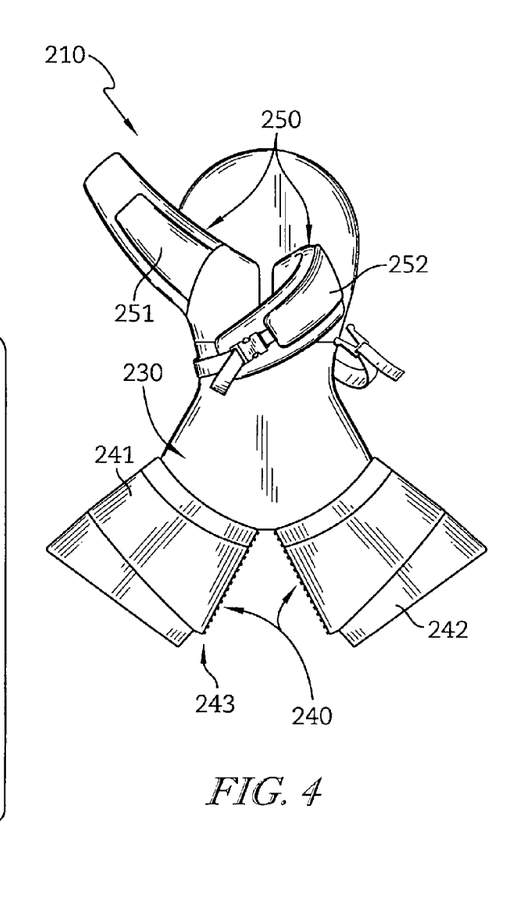
FIG. 4 is a top plan view of an unoccupied infant-swaddle restraint suitable for use in a motion-inhibitor apparatus in accordance with a second embodiment of the present disclosure and in a partly assembled mode.
Figures 5, 6:
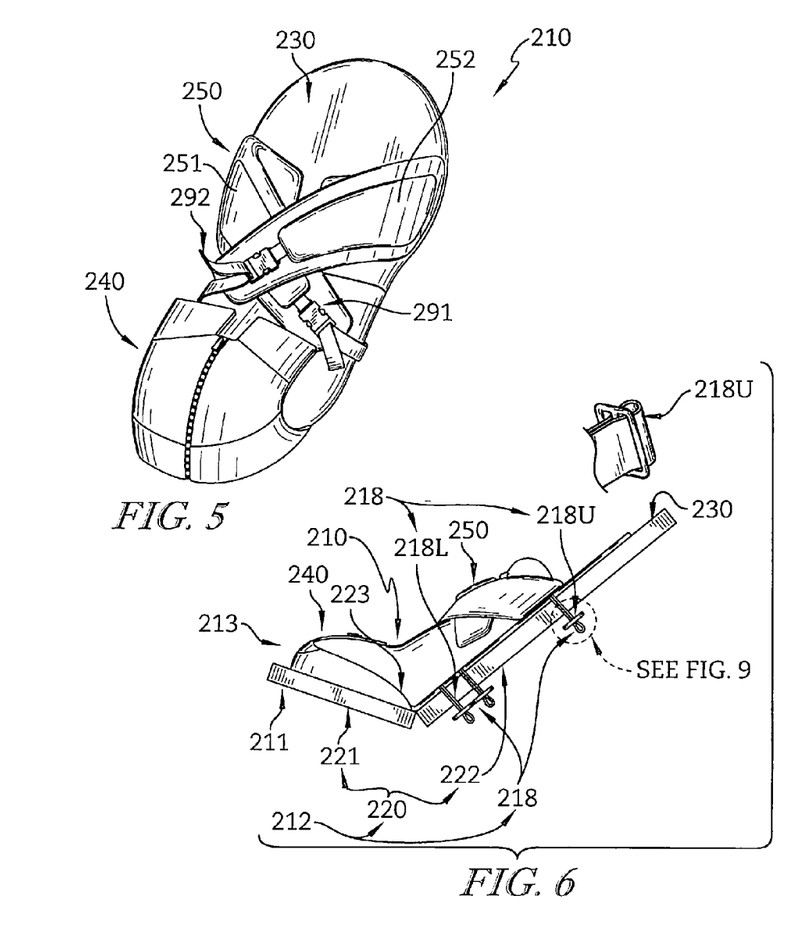
FIG. 5 is a perspective view of the unoccupied infant-swaddle restraint of FIG. 4 in an assembled mode showing that free ends of the left and right shoulder wings overlap and crisscross when the swaddled infant is restrained in the infant-swaddle restraint.
FIG. 6 is a diagrammatic side elevation view of the infant-swaddle restraint of FIG. 5 secured to a seat shell included in a juvenile seat in accordance with the present disclosure using two separated T-retainers that are each coupled to a backrest included in the infant-swaddle restraint as suggested, for example, in FIG. 9.
Figure 9:
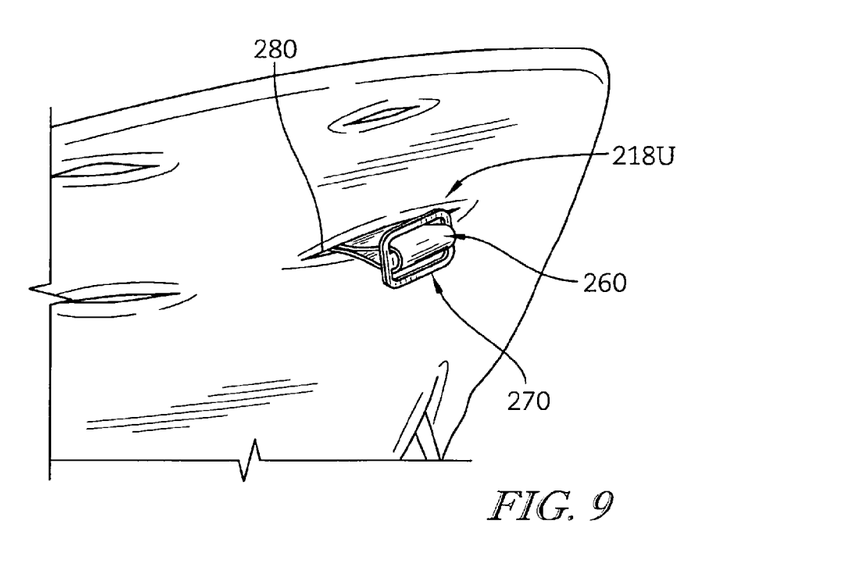
FIG. 9 is an enlarged perspective view of the circled region of FIG. 6 showing the T-retainer of FIG. 8 coupled to a seat back included in the juvenile seat.

A motion-inhibitor apparatus 211 in accordance with a second embodiment of the present disclosure comprises alternative infant-swaddle restraint 210 having a multi-piece foot-and-leg blanket 240 as shown in FIGS. 4-6 and an alternative swaddle harness 218 comprising first and second rear tethers 218U and 218L as shown, for example, in FIGS. 6 and 9. A motion-inhibitor apparatus 311 in accordance with a third embodiment of the present disclosure is shown, for example, in FIG. 16 and comprises a juvenile seat 312 including a seat shell 320 and a swaddle harness 218 and an infant-swaddle restraint 310 having a one-piece foot-and-leg blanket 340 shown, for example, in FIGS. 10-15.

Figure 2:
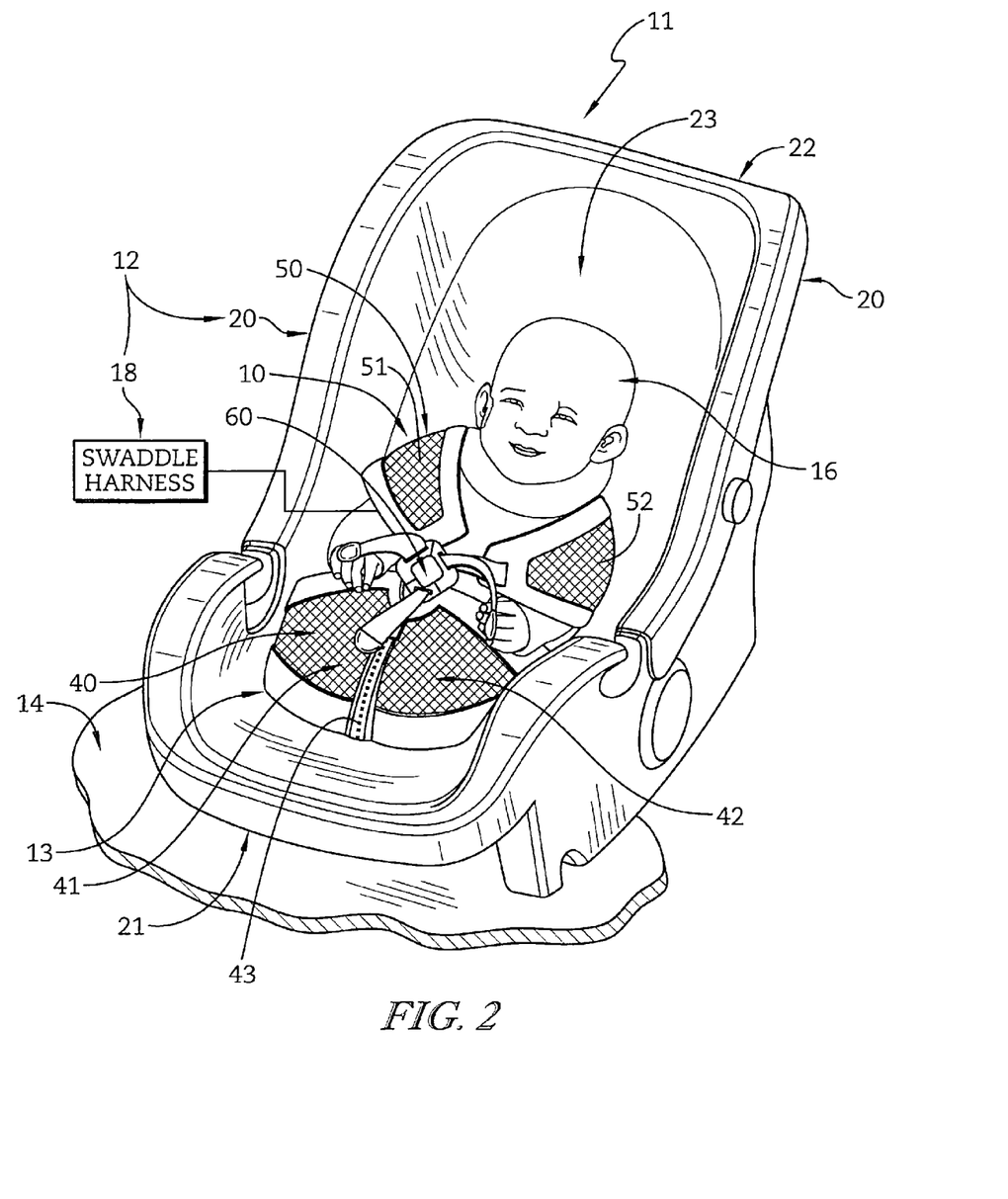
FIG. 2 is a perspective view of an occupied infant-swaddle restraint in the basin of a seat shell included in the juvenile seat and showing that free ends of the left and right shoulder wings converge without overlapping or crisscrossing when the center segment is mated with the left and right segments of the wing-and-blanket fastener and diagrammatically suggesting that the juvenile seat also includes a swaddle harness coupled to the seat shell and to the infant-swaddle restraint to retain the infant-swaddle restraint in a restrained swaddled position on the seat shell of the juvenile seat.
Figure 3:
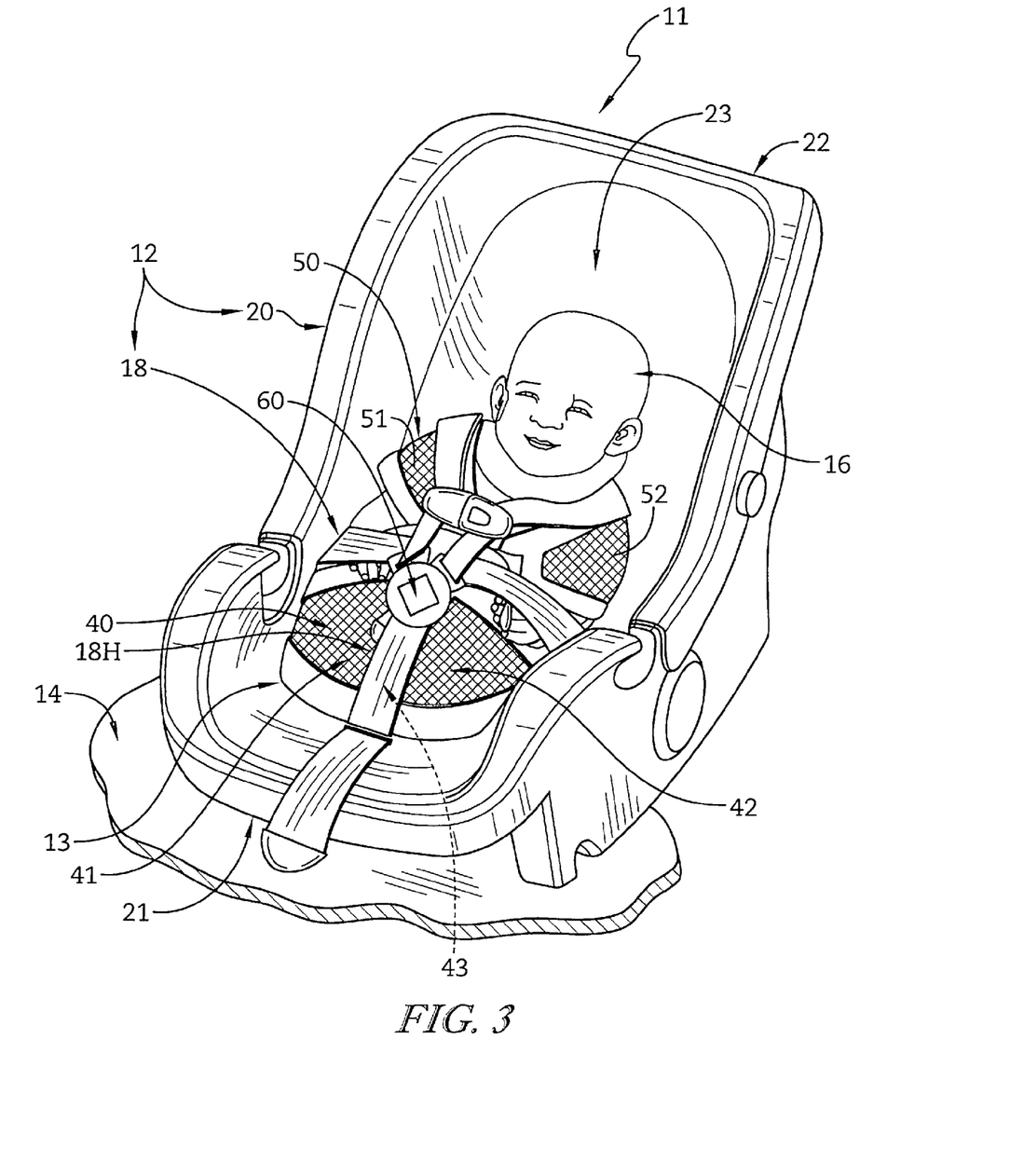
FIG. 3 is a perspective view of the motion-inhibitor apparatus of FIGS. 1 and 2 showing use of a swaddle harness defined by a five-point harness included in the juvenile seat and coupled to the seat shell to inhibit movement of the infant-swaddle restraint relative to the seat shell so that the swaddled infant is held in a restrained swaddled position on the seat shell of the juvenile seat.

Juvenile seat 12 of motion-inhibitor apparatus 11 includes a seat shell 20 and a swaddle harness 18 coupled to seat shell 20 as shown, for example, diagrammatically in FIG. 1 and illustratively in FIG. 3. Seat shell 20 includes a seat bottom 21 and a seat back 22 arranged to extend upwardly away from seat bottom 21 as shown in FIGS. 1-3. Seat bottom 21 and seat back 22 cooperate to form a forward-facing basin 23 that is sized and shaped to provide a generally concave surface to hold an infant 16 swaddled in an infant-swaddle restraint 10 in accordance with the present disclosure as suggested in FIG. 3. Swaddle harness 18 is a five-point child restraint harness in an illustrative embodiment as shown, for example, in FIG. 3. It is within the scope of the present disclosure to use any suitable harness in juvenile seat 12 that is coupled to seat shell 20 and maintain infant-swaddle restraint 10 in a generally stationary location on seat shell 20.

Infant-swaddle restraint 10 of motion-inhibitor apparatus 11 includes a backrest 30, a multi-piece foot-and-leg blanket 40, and a shoulder-and-upper-torso wrap 50 as shown, for example, in FIG. 1. Each of blanket 40 and wrap 50 is shown in an opened infant-receiving position in FIG. 1 and in a closed infant-swaddling position in FIGS. 2 and 3. Infant-swaddle restraint 10 is configured to provide means for enveloping an infant 16 reclined in a supine position in an infant-receiving space bounded by backrest 30, blanket 40, and wrap 50 in illustrative embodiments. It is within the scope of the present disclosure to configure infant-swaddle restraint 10 to envelop an infant in a prone position in that infant-receiving space.

Backrest 30 of infant-swaddle restraint 10 has an oblong shape in an illustrative embodiment and includes a lower panel 30L arranged to lie in basin 23 and to mate with seat bottom 21, an upper panel 30U arranged to lie in basin 23 and to mate with seat back 22, and a middle panel 30M arranged to interconnect lower panel 30L and upper panel 30U as shown, for example, in FIG. 1. Blanket 40 is coupled to a perimeter portion of lower panel 30L and wrap 50 is coupled to an interior portion of middle panel 30M as suggested in FIG. 1. Slots 31, 32 are formed in upper panel 30U to receive the shoulder straps (not shown) of any existing passenger-restraint harness provided in a vehicle in which juvenile seat 10 is used. Wrap 50 is positioned to lie in a space provided between blanket 40 and slots 31, 32 as shown, for example, in FIG. 1. Backrest 30 is made of a pliable padded backing material in illustrative embodiments of the present disclosure.

Blanket 40 of infant-swaddle restraint 10 is coupled to a lower perimeter edge of backrest 30 as suggested in FIG. 1. Blanket 40 is configured to cover the feet and legs of an infant 16 swaddled in infant-swaddle restraint 10 as shown, for example, in FIGS. 2 and 3. Blanket 40 cooperates with lower panel 30L of backrest 30 to form a top-opening bag 13 as suggested in FIGS. 1-3.

In illustrative embodiments, blanket 40 includes a left blanket portion 41, a right blanket portion 42, and a center fastener 43 in illustrative embodiments as shown in FIGS. 1 and 2. Left blanket portion 41 is coupled along a lower perimeter edge thereof to a left perimeter portion of lower panel 30L. Right blanket portion 42 is coupled along a lower perimeter edge thereof to a right perimeter portion of lower panel 30L. Center fastener 43 is coupled to companion inner perimeter edges of left and right blanket portions as shown in FIG. 1 and is configured to cause those edges to mate as shown in FIG. 2 to align left and right blanket portions 41, 42 in end-to-end relation to form blanket 40. Center fastener 43 is a zipper or a hook-and-loop fastener or buttons or snaps in illustrative embodiments.

Wrap 50 of infant-swaddle restraint 10 is configured to cover the upper torso and shoulders of an infant 16 swaddled in infant-swaddle restraint 10 as shown, for example, in FIGS. 2 and 3. Wrap 50 includes a left shoulder wing 51 and a right shoulder wing 52. Left shoulder wing 51 is coupled along an inner perimeter edge thereof to a left-side interior portion of middle panel 30M. Right shoulder wing 52 is coupled along an inner perimeter edge thereof to a right-side interior portion of middle panel 30M.

A wing-and-blanket fastener 60 is also included in infant-swaddle restraint 10 as suggested in FIGS. 1-3. Fastener 60 comprises a left segment 61 coupled to a free end of left shoulder wing 51, a right segment 62 coupled to a free end of right shoulder wing 52, and a center segment 63 coupled to a movable portion of center fastener 53. Left, right, and center segments 61-63 are configured to mate with one another in any suitable manner and illustratively in a manner shown in FIG. 2 to retain blanket 40 and wrap 50 in an infant-swaddling position relative to backrest 30 as shown, for example, in FIG. 2.

Infant-swaddle restraint 10 is configured to swaddle an infant 16 and to be retained in a stationary position in a juvenile seat 12 using a harness 18 included in juvenile seat 12 to provide a motion-inhibitor apparatus 11 as suggested in FIGS. 1-3. In use, an occupied infant-swaddle restraint 10 is set into a cavity 23 formed in a seat shell 22 and arranged to lie adjacent to straps 61-63 included in a fastener 60 that is coupled to seat shell 22. Infant 16 lies on an interior surface of backrest 30 and in an infant-receiving space formed in infant-swaddle restraint 10 and bounded by backrest 30, foot-and-leg blanket 40, and shoulder-and-upper-torso wrap 50. Center fastener 43 is operated to draw left and right blanket portions 41, 42 together to form blanket 40 cooperating with lower panel 30L of backrest 30 to provide a top-opening bag 13 containing the feet and legs of infant 16. Left and right shoulder wings 51, 52 wrap around the shoulders and upper torso of infant 16 leaving only (in certain illustrative embodiments) the lower torso of infant 16 exposed.

As suggested in FIG. 3, the arms, legs, feet, and upper torso of the swaddled infant 16 are constrained by infant-swaddle restraint 10 so that these portions of infant 16 are maintained firmly but comfortably in immobile positions. Thus, infant-swaddle restraint 10 limits movement of most of the infant's body relative to the surroundings to provide comfort and succor to infant 16.

Motion-inhibitor apparatus 11 includes a juvenile seat 12 and a seat pad 10 that is adapted to be placed on juvenile seat 12 by a caregiver as suggested in FIG. 1. Juvenile seat 12 is adapted to be used on a passenger seat 14 in a vehicle.

Seat pad 10 is configured to provide infant-swaddle restraint means for enveloping an infant 16 reclined in, for example, a supine position in an infant-receiving space so that the shoulders, upper torso, legs, and feet of the infant 16 are substantially covered to swaddle the infant as suggested in FIG. 3. Juvenile seat 12 includes a seat shell 20 and a swaddle harness 18 coupled to seat shell 20 and to infant-swaddle restraint 10. Swaddle harness 18 is configured to inhibit movement of infant-swaddle restraint 10 (and an infant 16 received therein) relative to seat shell 20 while infant-swaddle restraint 10 is located on seat shell 12.

Seat shell 20 includes a seat bottom 21 and a seat back 22 extending upwardly from seat bottom 21 to form a basin 23 in which infant-swaddle restraint 10 and an infant 16 swaddled therein may be placed by a caregiver as suggested in FIG. 3. Infant-swaddle restraint 10 includes a backrest 30 made of a pliable material to conform as needed to portions of seat bottom 21 and seat back 22 in basin 23 formed in seat shell 20. Swaddle harness 18 comprises a five-point harness 18H that is arranged to interconnect infant-swaddle restraint 10 and seat shell 20 as shown, for example, in FIG. 3.

Infant-swaddle restraint 10 of motion-inhibitor apparatus 11 also includes a top-opening bag 13 sized to receive and cover at least the feet and legs of the infant 16 swaddled in the infant-swaddle restraint 10 as suggested in FIGS. 2 and 3. A right blanket portion 42 is pivotably coupled to an outer edge of a lower right-side portion of backrest 30, a left blanket portion 41 is pivotably coupled to an outer edge of a lower left-side portion of backrest 30, and a center fastener 43 is configured to provide means for selectively coupling right blanket portion 42 to left blanket portion 41 to form a blanket 40 that cooperates with a companion lower panel 30L included in backrest 30 to form top-opening bag 13.

Infant-swaddle restraint 10 also includes a left shoulder wing 51 pivotably coupled to a left-side region of an upper panel portion 30U of backrest 30 and a right shoulder wing 52 pivotably coupled to a right-side region of upper panel 30U of backrest 30 as suggested in FIG. 1. Left and right shoulder wings 51, 52 wrap around the shoulders and upper torso of an infant 16 swaddled in infant-swaddle restraint 10 while the feet and legs of the swaddled infant 16 remain covered in top-opening bag 13 provided below left and right shoulder wings 51, 52.

Infant-swaddle restraint 10 of motion-inhibitor apparatus 11 further includes a wing-and-blanket fastener 60 configured to provide means for coupling top-opening blanket 13 to each of left and right shoulder wings 51, 52 to form an outer covering that cooperates with backrest 30 to form the infant-receiving space in the infant-swaddle restraint 10 as suggested in FIGS. 2 and 3. Wing-and-blanket fastener 60 comprises a left segment 61 coupled to left shoulder wing 51, a right segment 62 coupled to right shoulder wing 52, and a center segment 63 coupled to center fastener 53 and configured to mate with left and right segments 61, 62.

An infant-swaddle restraint 210 for inclusion in a motion-inhibitor apparatus 211 in accordance with a second embodiment of the present disclosure is shown, for example, in FIGS. 4-9. Infant-swaddle restraint 210 includes a backrest 230, a multi-piece foot-and-leg blanket 240, and a shoulder-and-upper-torso wrap 250 as suggested in FIGS. 4 and 5. Motion-inhibitor apparatus 211 includes a juvenile seat 212 and infant-swaddle restraint 210 as suggested in FIG. 6. Juvenile seat 212 includes a seat shell 220 and a swaddle harness 218 comprising upper and lower rear tethers 218U, 218L as suggested in FIG. 6. Each tether 218U, 218L includes one end coupled to backrest 230 and another end coupled to a seat back 222 of seat shell 220 of juvenile seat 212 as suggested in FIG. 6. Juvenile seat 212 also includes a seat bottom 221 in illustrative embodiments. In this embodiment, it is not necessary to use a five-point harness (not shown) that may be included in juvenile seat 220 owing to the use of swaddle harness 218.

Figure 7:
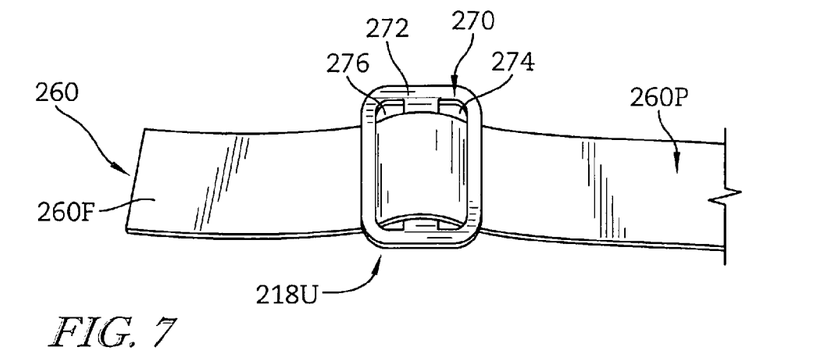
FIG. 7 is an enlarged view of an illustrative T-retainer comprising a tri-glide fastener coupled to restraint webbing.
Figure 8:
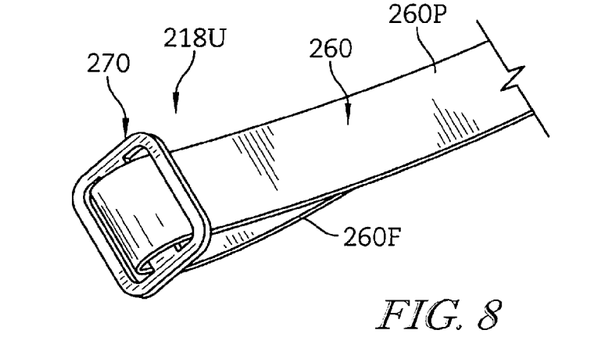
FIG. 8 is a perspective view of the T-retainer of FIG. 7 after the free end of the restraint webbing has been folded under the proximal portion of the restraint webbing.

Tether 218U comprises a restraint webbing 260 and a tri-glide fastener 270 as shown, for example, in FIGS. 7-9. Restraint webbing 260 is made of a pliable strap. Tri-glide fastener 270 comprises a plate 272 formed to include first and second webbing-receiving slots 274, 276 as shown in FIG. 7. Webbing 260 passes through each of first and second webbing-receiving slots 274, 276 and includes a free end 260F and a proximal portion 260P coupled to backrest 230 of infant-swaddle restraint 210 as shown in FIG. 7. Tri-glide fastener 270 can be pivoted on a folded webbing 260 as shown in FIG. 8 and then passed through a slot 280 formed in seat back 222 of juvenile seat 220 as suggested in FIGS. 6 and 9 to anchor tether 218U to juvenile seat 220. Tether 218U can be anchored to juvenile seat 220 in any suitable manner. Tether 218L is similar in construction and use to tether 218U.

Motion-inhibitor apparatus 211 includes a juvenile seat 212 and a seat pad 210 adapted to be placed on juvenile seat 212 by a caregiver as suggested in FIGS. 5 and 6. Juvenile seat 12 is adapted to be used on a passenger seat in a vehicle.

Seat pad 210 is configured to provide infant-swaddle restraint means for enveloping an infant reclined in, for example, a supine position in an infant-receiving space so that the shoulders, upper torso, legs, and feet of the infant are substantially covered to swaddle the infant as suggested in FIG. 6. Juvenile seat 212 includes a seat shell 220 and a swaddle harness 218 coupled to seat shell 220 and to infant-swaddle restraint 210. Swaddle harness 218 is configured to inhibit movement of infant-swaddle restraint 210 (and an infant received therein) relative to seat shell 220 while infant-swaddle restraint 210 is located on seat shell 220.

Seat shell 220 includes a seat bottom 221 and a seat back 222 extending upwardly from seat bottom 221 to form a basin 223 in which infant-swaddle restraint 210 and an infant swaddled therein may be placed by a caregiver as suggested in FIG. 6. Infant-swaddle restraint 210 includes a backrest 230 made of a pliable material to conform as needed to portions of seat bottom 221 and seat back 222 in basin 223 formed in seat shell 220. Swaddle harness 218 comprises an upper tether 218U and a lower tether 218L that are each arranged to interconnect infant-swaddle restraint 10 and seat shell 220.

Infant-swaddle restraint 210 of motion-inhibitor apparatus 211 also includes a top-opening bag 213 sized to receive and cover at least the feet and legs of the infant swaddled in the infant-swaddle restraint 210 as suggested in FIG. 6. A right blanket portion 242 is pivotably coupled to an outer edge of a lower right-side portion of backrest 230, a left blanket portion 241 is pivotably coupled to an outer edge of a lower left-side portion of backrest 230, and a center fastener 243 is configured to provide means for selectively coupling right blanket portion 242 to left blanket portion 241 to form a blanket 240 that cooperates with a companion lower panel included in backrest 230 to form a top-opening bag 213 as suggested in FIGS. 4-6.

Infant-swaddle restraint 210 also includes a shoulder-and-upper-torso wrap 50 comprising a left shoulder wing 251 pivotably coupled to a left-side region of an upper panel portion of backrest 230 and a right shoulder wing 252 pivotably coupled to a right-side region of the upper panel of backrest 230 as suggested in FIG. 4. Left and right shoulder wings 251, 252 wrap around the shoulders and upper torso of an infant swaddled in infant-swaddle restraint 210 while the feet and legs of the swaddled infant remain covered by the foot-and-leg blanket 240 provided below left and right shoulder wings 251, 252 as suggested in FIG. 5.

Shoulder-and-upper-torso wrap 250 of infant-swaddle restraint 210 further includes a wing fastener 290 configured to provide means for coupling left and right shoulder wings 251, 252 to one another to cooperate with blanket 240 to form an outer covering that cooperates with backrest 230 to form the infant-receiving space in infant-swaddle restraint means 210 as suggested in FIG. 5. Wing fastener 290 comprises a left segment 291 coupled to left shoulder wing 251 and a right segment 292 coupled to right shoulder wing 252 as suggested in FIG. 5.

Figure 16:
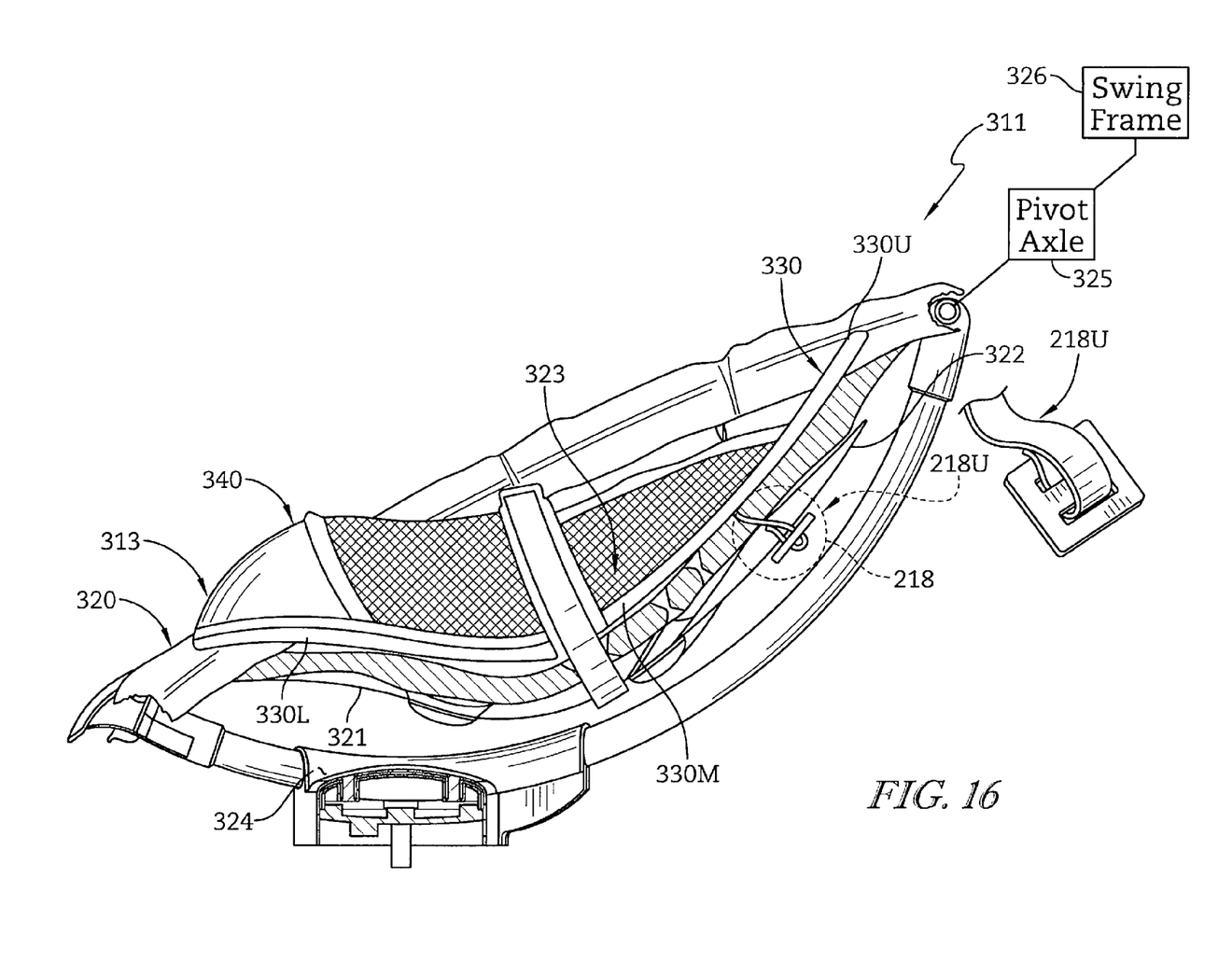
FIG. 16 is a side elevation view, with portions broken away, of a motion-inhibitor apparatus in accordance with the third embodiment of the present disclosure showing a juvenile seat adapted to be mounted on a swing frame for swinging movement about a horizontal swing axis and showing that the infant-swaddle restraint of FIGS. 10-15 is placed in a basin formed in a seat shell of the juvenile seat and showing that the juvenile seat also includes a swaddle harness coupled to an upper panel of a backrest of the infant-swaddle restraint and to the seat shell by a swaddle anchor tether, and a waist-restraint belt included in the infant-swaddle restraint is also coupled to a lower panel of the seat shell.

A motion-inhibitor apparatus 311 in accordance with a third embodiment of the present disclosure includes a juvenile seat 312 and an infant-swaddle restraint 310 having a one-piece blanket 340 as shown, for example, in FIG. 16. Juvenile seat 312 includes a seat shell 320 that is adapted to be mounted on a swing frame for swinging movement about a horizontal swing axis. Seat shell 320 includes a seat bottom 321 and a seat back 322 as suggested in FIG. 16. Juvenile seat 312 also includes a swaddle harness 218 comprising an upper rear tether 218U having one end coupled to infant-swaddle restraint 310 and another end coupled to seat back 322 of seat shell 320 of juvenile seat 312 as suggested in FIG. 16.

Seat bottom 321 and seat back 322 of seat shell 320 cooperate to form a forward-facing basin 323 that is sized and shaped to provide a generally concave surface to hold an infant swaddled in an infant-swaddle restraint 310 as suggested in FIG. 16. As suggested in FIG. 16, juvenile seat 312 is adapted for use in a juvenile swing unit and also includes a swing seat frame 324 coupled to seat bottom 321 and seat back 322. Swing seat frame 324 is configured to be coupled in any suitable manner (e.g., hanger arms) to a pivot axle 325 included in a swing frame 326 as suggested diagrammatically in FIG. 16.

Figure 10:
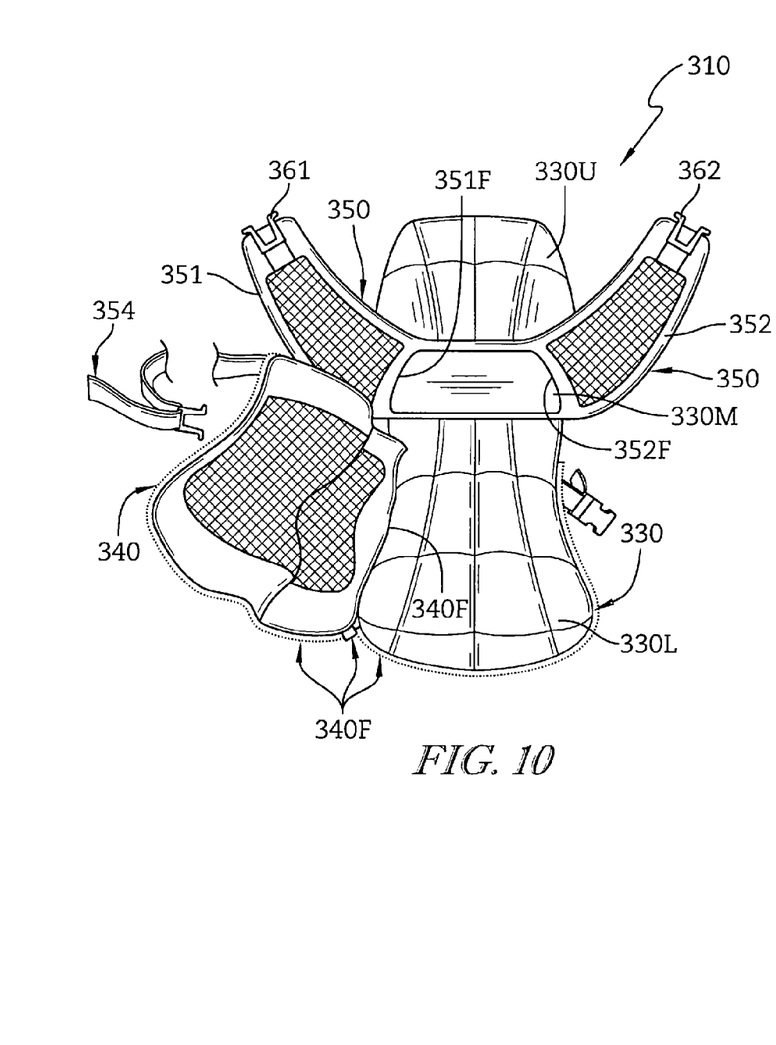
FIG. 10 is a top plan view of an unoccupied infant-swaddle restraint suitable for use in a motion-inhibitor apparatus in accordance with a third embodiment of the present disclosure and in an unassembled mode and showing that the infant-swaddle restraint includes a backrest, a shoulder-and-torso wrap including left and right shoulder wings in their opened positions, and a one-piece foot-and-leg blanket in an opened position.
Figure 11:
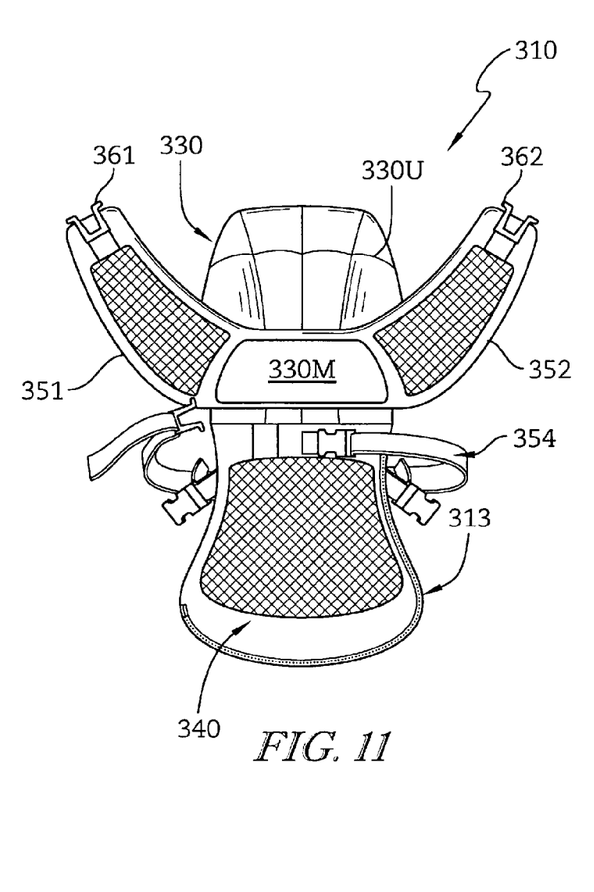
FIG. 11 is a view similar to FIG. 10 showing the one-piece foot-and-leg blanket in a closed position.
Figure 12:
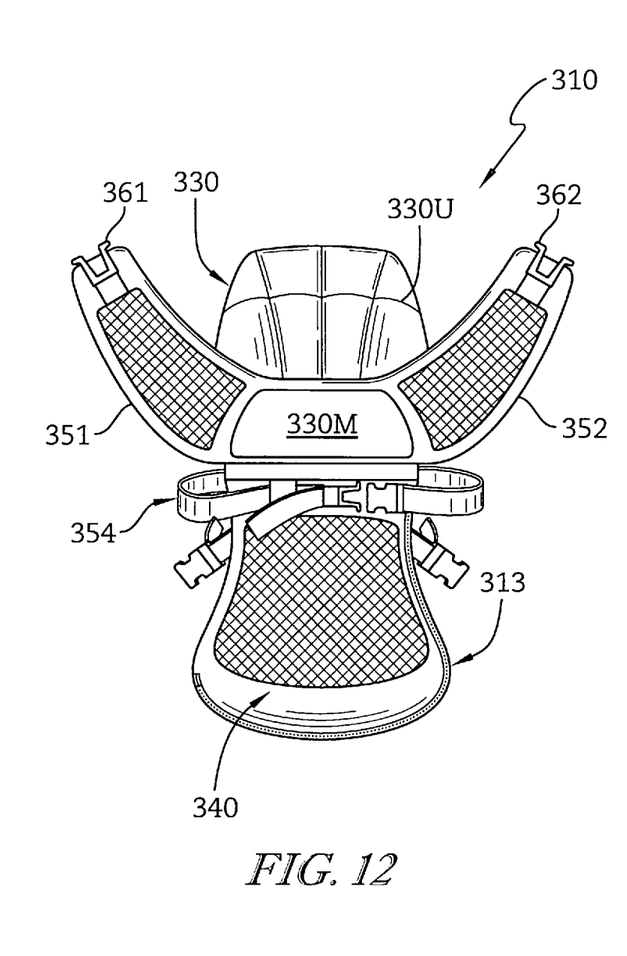
FIG. 12 is a view similar to FIGS. 10 and 11 showing that a waist-resistant belt is wrapped loosely around an upper portion of the one-piece foot-and-leg blanket.
Figure 13:
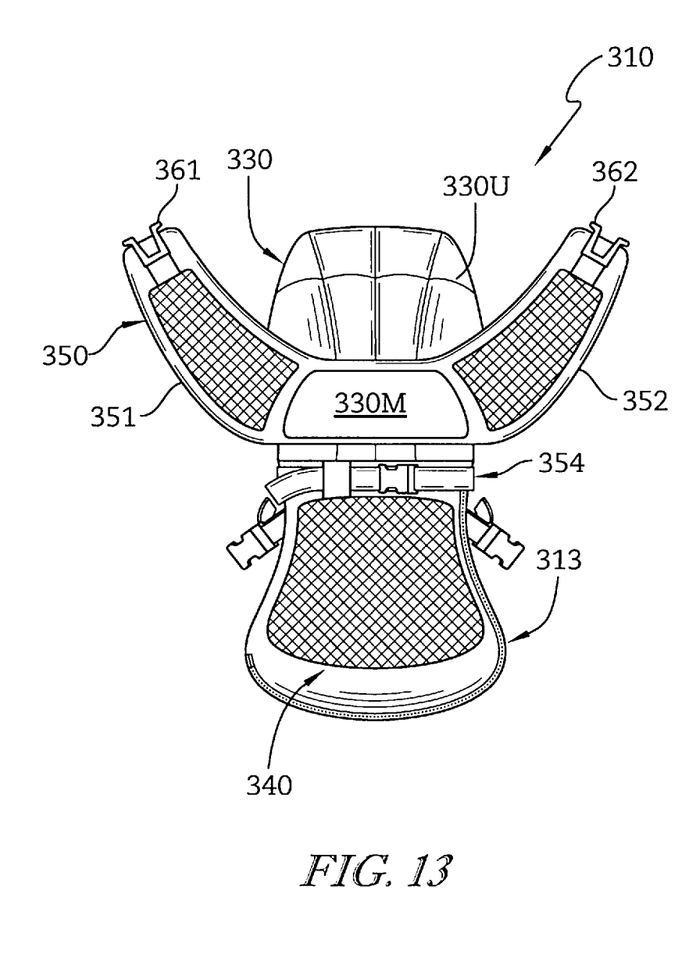
FIG. 13 is a view similar to FIGS. 10-12 showing that the waist-restraint belt is wrapped tightly around the upper portion of the one-piece foot-and-leg blanket.
Figure 14:
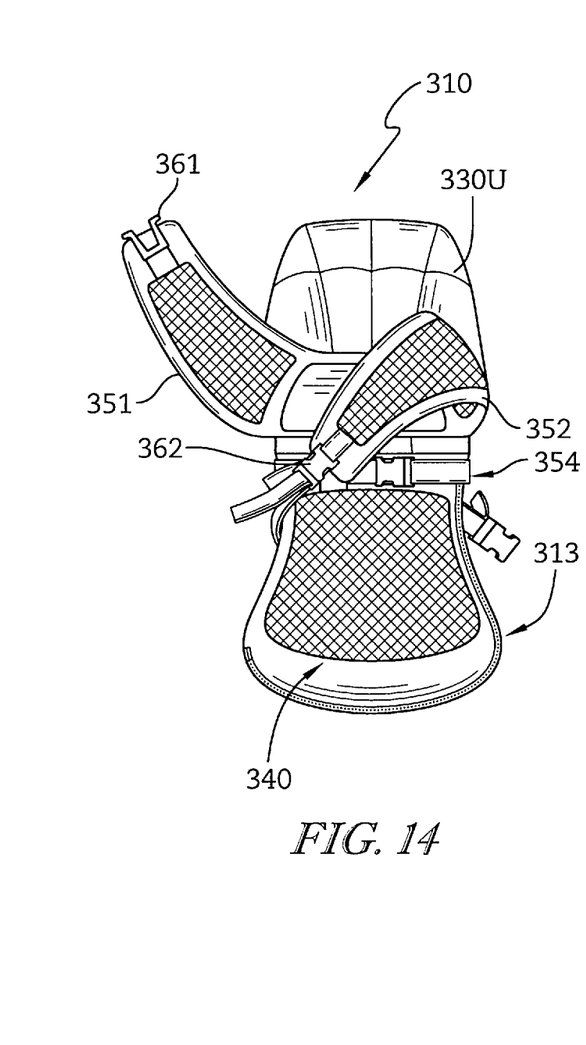
FIG. 14 is a view similar to FIGS. 10-13 showing the right shoulder wing after it has been folded and secured to assume a positively sloping orientation.

Infant-swaddle restraint 310 of motion-inhibitor apparatus 310 is shown in an opened unoccupied configuration in FIG. 10. Infant-swaddle restraint 310 includes a backrest 330, a one-piece foot-and-leg blanket 340, and a shoulder-and-upper-torso wrap 350. Each of blanket 340 and wrap 350 is shown in an opened infant-receiving position in FIG. 1 and in a closed infant-swaddling position in FIGS. 15 and 16. An illustrative manner of closing blanket 340 and wrap 350 is shown in FIGS. 10-15. Infant-swaddle restraint 310 is configured to provide means for enveloping an infant (not shown) reclined in an infant-receiving space bounded by backrest 330, blanket 340, and wrap 350 in illustrative embodiments. It is within the scope of the present disclosure to envelope an infant in a prone position in that infant-receiving space.

Backrest 330 of infant-swaddle restraint 310 has salt-shaker shape as shown in FIG. 10. Backrest 330 includes a lower panel 330L, an upper panel 330U, and a middle panel 330M arranged to interconnect lower and upper panels 330L, 330M. Lower panel 330L is arranged to lie in basin 323 and to mate with seat bottom 321 as suggested in FIG. 16. Middle and upper panels 330M, 330U are arranged to lie in basin 323 and to mate with seat back 322. Backrest 330 is made of a pliable padded backing material in illustrative embodiments of the present disclosure.

Blanket 340 is coupled along fold line 340F to a left-side perimeter portion of lower panel 330L as shown in FIG. 10. Blanket 340 can be folded along fold line 340F and then secured to bottom-side and right-side perimeter portions of lower panel 330L as suggested in FIGS. 10 and 11 to form an open-top bag 213 sized to receive and cover the feet and legs of an infant swaddled in the infant-swaddle restraint 310.

Wrap 350 is coupled to perimeter portions of middle panel 330M as shown in FIG. 10. Wrap 350 of infant-swaddle restraint 310 is configured to cover the upper torso and shoulders of an infant swaddled in infant-swaddle restraint 310 as suggested in FIG. 15. Wrap 350 includes a left shoulder wing 351 coupled to a left-side perimeter portion of middle panel 330M along a left-side fold line 351F and a right shoulder wing 352 coupled to a right-side perimeter portion of middle panel 330M along a right-side fold line 352F.

A motion-inhibitor apparatus 311 includes a juvenile seat 312 and a seat pad 310 that is adapted to be placed on juvenile seat 312 by a caregiver as suggested in FIG. 16. Juvenile seat 312 is adapted to be mounted on a swing frame 324 for swinging movement about a horizontal swing axis defined by a pivot axle 325 as suggested in FIG. 16.

Figure 15:
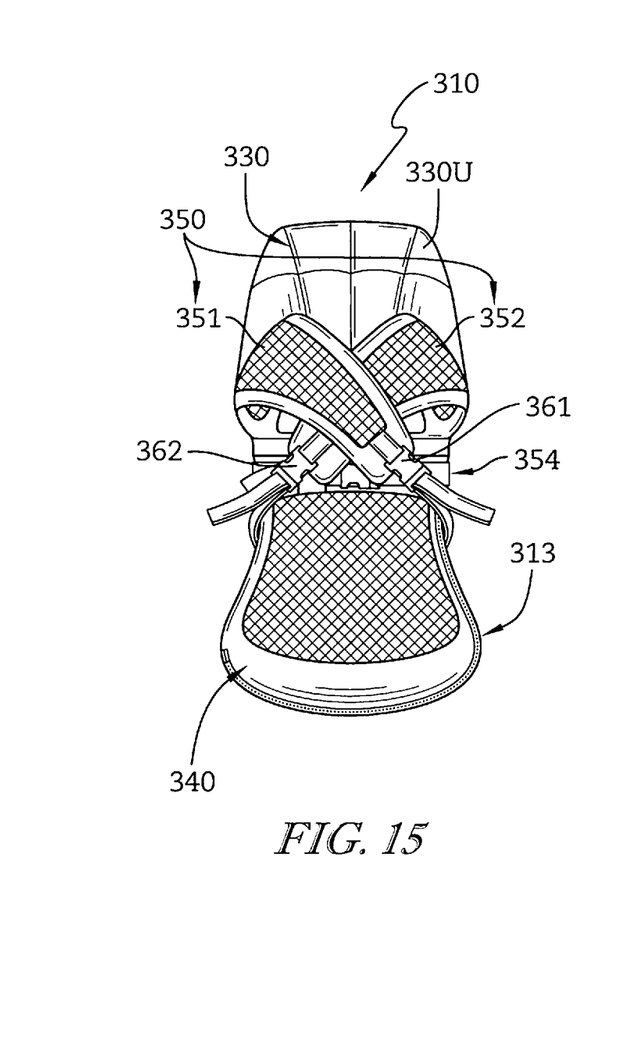
FIG. 15 is a view similar to FIGS. 10-14 showing the left shoulder wing after it has been folded and secured to assume a negatively sloping orientation overlapping and crisscrossing the folded and secured right shoulder wing.

Seat pad 310 is configured to provide infant-swaddle restraint means for enveloping an infant reclined in, for example, a supine position in an infant-receiving space so that the shoulders, upper torso, legs, and feet of the infant are substantially covered to swaddle the infant as suggested in FIGS. 15 and 16. Juvenile seat 312 includes a seat shell 320 and a swaddle harness 318 coupled to seat shell 320 and to infant-swaddle restraint 310. Swaddle harness 318 is configured to inhibit movement of infant-swaddle restraint 310 (and an infant received therein) relative to seat shell 320 while infant-swaddle restraint 310 is located on seat shell 320.

Seat shell 320 includes a seat bottom 321 and a seat back 322 extending upwardly from seat bottom 321 to form a basin 323 in which infant-swaddle restraint 310 and an infant swaddled therein may be placed by a caregiver as suggested in FIG. 16. Infant-swaddle restraint 310 includes a backrest 330 made of a pliable material to conform as needed to portions of seat bottom 321 and seat back 322 in basin 323 formed in seat shell 320. Swaddle harness comprises a tether 218 that is arranged to interconnect infant-swaddle restraint 310 and seat shell 320.

Infant-swaddle restraint 310 of motion-inhibitor apparatus 311 also includes a top-opening bag 313 sized to receive and cover at least the feet and legs of the infant swaddled in infant-swaddle restraint 310 as suggested in FIGS. 15 and 16. Top-opening bag 313 includes a one-piece blanket 340 coupled to backrest 330 and a blanket fastener 340F as suggested in FIG. 10 coupled to backrest 330 and the one-piece blanket 340 to form a top-opening bag 313.

Infant-swaddle restraint 310 also includes a shoulder-and-upper-torso wrap 350 comprising a left shoulder wing 351 pivotably coupled to a left-side region of an upper panel portion 330U of backrest 330 and a right shoulder wing 352 pivotably coupled to a right-side region of upper panel 330U of backrest 330 as shown in FIGS. 10-15. Left and right shoulder wings 351, 252 wrap around the shoulders and upper torso of an infant swaddled in infant-swaddle restraint 310 while the feet and legs of the swaddled infant remain covered by the foot-and-leg blanket 340 provided below left and right shoulder wings 351, 352.

Shoulder-and-upper-torso wrap 350 of infant-swaddle restraint 310 further includes a wing-and-blanket fastener 360 configured to provide means for coupling the foot-and-leg blanket 340 to each of left and right shoulder wings 351, 352 to form an outer covering that cooperates with backrest 330 to form the infant-receiving space in infant-swaddle restraint 310 as suggested in FIGS. 15 and 16. A waist-restraint belt 354 coupled to an upper portion of a one-piece single blanket and to the backrest, a first wing-restraint belt 361 coupled to a free end of left shoulder wing 351 and to backrest 330 and configured to tether left shoulder wing 351 to a right-side portion of the lower panel 330L included in backrest 330, and a second wing-restraint belt 362 coupled to a free end of right shoulder wing 352 and configured to tether right shoulder wing 352 to a left-side portion of lower panel 330L included in backrest 330 to cause left and right shoulder wings 351, 352 to crisscross and overlap one another as suggested in FIG. 15.

Closure of foot-and-leg blanket 340 and shoulder-and-upper-torso wrap 350 to swaddle an infant (not shown) is shown in an illustrative sequence in FIGS. 10-15. Blanket 340 and wrap 350 are shown in opened positions in FIG. 10. As suggested in FIG. 11, blanket 340 is closed using fastener 340F (e.g., zipper) to establish top-opening bag 313 and waist-restraint belt 354 is wrapped around from the right side to the left side while wrap 350 remains opened. As suggested in FIG. 12, waist-restraint belt 354 is wrapped around the periphery of blanket 340. Waist-restraint belt 354 is then tightened for proper fit a suggested in FIG. 13. As suggested in FIG. 14, right shoulder wing 352 is folded over and across the chest of an infant and the restraint buckle is fastened. Then the left shoulder wing 351 is folded over and across the infant and the restraint buckle is fastened as suggested in FIG. 15.

The invention claimed is:

1. A motion-inhibitor apparatus comprising
a juvenile seat includes a seat shell, a tether and a swaddle harness with one end of the tether coupled to the seat shell and
an infant-swaddle restraint means for enveloping an infant reclined in a supine position in an infant-receiving space so that shoulders, upper torso, legs, and feet of the infant are substantially covered to swaddle the infant, wherein the tether passes thru the seat shell and a second end of the tether is coupled to the infant-swaddle restraint means and wherein the swaddle harness is coupled to the restraint means to inhibit movement of the infant-swaddle restraint means relative to the seat shell while the infant-swaddle restraint means is located on the seat shell.

2. The motion-inhibitor apparatus of claim 1, wherein the seat shell includes a seat bottom and a seat back extending upwardly from the seat bottom to form a basin in which infant-swaddle restraint means is located, the infant-swaddle restraint means includes a backrest made of a pliable material to conform as needed to portions of the seat bottom and seat back in the basin formed in the seat shell.

3. The motion-inhibitor apparatus of claim 2, wherein the infant-swaddle restraint means also includes a foot-and-leg blanket coupled to the backrest and arranged to cooperate with the backrest to form a top-opening bag sized to receive and cover at least the feet and legs of the infant swaddled in the infant-swaddle restraint means and arranged to open toward a head of an infant swaddled in the infant-swaddle restraint means.

4. The motion-inhibitor apparatus of claim 3,
wherein the infant-swaddle restraint means also includes a shoulder-and-upper-torso wrap comprising a left shoulder wing separated from the foot-and-leg blanket and pivotably coupled to a left-side region of a middle panel portion of the backrest and a right shoulder wing separated from the foot-and-leg blanket and pivotably coupled to a right-side region of the middle panel of the backrest and the left and right shoulder wings are arranged to wrap around the shoulders and upper torso or an infant swaddled in the infant-swaddle restraint means while the feet and legs of the swaddled infant remain covered by the foot-and-leg blanket provided below the left and right shoulder wings.

5. The motion-inhibitor apparatus of claim 4, wherein the shoulder-and-upper-torso wrap further comprises a wing fastener configured to provide means for anchoring a free end of each of the left and right shoulder wings to lie in a stationary position relative to the backrest to retain the left and right shoulder wings in a closed infant-swaddling position covering the middle panel of the backrest.

6. The motion-inhibitor apparatus of claim 5, wherein the backrest further includes a lower panel and an upper panel arranged to lie in spaced-apart relation to the lower panel to locate the middle panel therebetween, the middle panel is arranged to interconnect the lower and upper panels, the lower panel is coupled to the foot-and-leg blanket to form the top-opening bag, the upper panel is adapted to underlie a head of an infant swaddled in the top-opening bag, and the middle panel is arranged to be covered by the left and right shoulder wings in the closed infant-swaddling position.

7. The motion-inhibitor apparatus of claim 6, wherein the swaddle harness comprises an upper rear tether coupled to the seat shell and to an upper portion of the middle panel of the backrest in a region near the upper panel and a lower rear tether coupled to the seat shell and to a lower portion of the middle panel of the backrest in a lower region near the lower panel and between the upper region and the lower panel.

8. The motion-inhibitor apparatus of claim 3, wherein the backrest further includes, a lower panel coupled to the foot-and-leg blanket to form the top-opening bag, an upper panel adapted to underlie a head of an infant restrained in the infant-swaddle restraint means, and a middle panel arranged to interconnect the upper and lower panels and the infant-swaddle restraint means further includes a shoulder-and-upper-torso wrap coupled to the middle panel and arranged to be moved relative to the middle panel of the backrest between an opened infant-receiving position uncovering the middle panel of the backrest and a closed infant-swaddling position covering the middle panel of the backrest, and the upper panel is arranged to lie in spaced-apart relation to the lower panel to locate the middle panel therebetween, the middle panel is arranged to interconnect the lower and upper panels, and the lower panel is coupled to the foot-and-leg blanket to form the top-opening bag.

9. The motion inhibitor apparatus of claim 3,
wherein the foot-and-leg blanket is a one-piece component and the tether further includes a blanket fastener coupled to the backrest and to the one-piece foot-and-leg blanket to form the top-opening bag.

10. The motion-inhibitor apparatus of claim 9, wherein the infant-swaddle restraint means also includes a left shoulder wing pivotably coupled to a left-side region of a middle panel portion of the backrest and a right shoulder wing pivotably coupled to a right-side region of the middle panel of the backrest and the left and right shoulder wings are arranged to wrap around the shoulders and upper torso or an infant swaddled in the infant-swaddle restraint while the feet and legs of the swaddled infant remain covered by the one-piece foot-and-leg blanket provided below the left and right shoulder wings.

11. The motion-inhibitor apparatus of claim 9, wherein the backrest further includes a lower panel coupled to the middle panel, the one-piece foot-and-leg blanket is coupled to a first-side perimeter portion of the lower panel of the backrest along a fold line and arranged to be moved relative to and away from the backrest between an opened infant-receiving position uncovering the lower panel of the backrest and a closed infant-swaddling position covering the lower panel of the backrest, and the blanket fastener is configured to provide means for selectively coupling a bottom-side perimeter portion of the lower panel and a second-side perimeter portion of the lower panel to an exposed perimeter edge of the one-piece foot-and-leg blanket to cooperate with the lower panel of the backrest to form the top-opening bag.

12. The motion-inhibitor apparatus of claim 11, wherein the infant-swaddle restraint means further includes a shoulder-and-upper-torso wrap coupled to perimeter portions of the middle panel of the backrest and separated from the top-opening bag to cover the upper torso and shoulders of an infant swaddled in the infant-swaddle restraint means.

13. The motion-inhibitor apparatus of claim 11, wherein the backrest further includes an upper panel adapted to underlie a head of an infant restrained in the infant-swaddle restraint means and a middle panel arranged to interconnect the upper and lower panels and the infant-swaddle restraint means further includes a shoulder-and-upper-torso wrap coupled to the middle panel and arranged to be moved relative to the middle panel of the backrest between an opened infant-receiving position uncovering the middle panel of the backrest and a closed infant-swaddling position covering the middle panel of the backrest.

14. The motion-inhibitor apparatus of claim 13, wherein the shoulder-and-upper-torso wrap includes a left shoulder wing coupled to a left-side perimeter portion of the middle panel along a left-side fold line and a right shoulder wing coupled to a right-side perimeter portion of the middle panel along a right-side fold line for folding movement between the opened infant-receiving position and the closed infant-swaddling position.

15. A motion-inhibitor apparatus comprising
a juvenile seat includes a seat shell and a swaddle harness coupled to the seat shell,
wherein the seat shell includes a seat bottom and a seat back extending upwardly from the seat bottom to form a basin in which infant-swaddle restraint means is located,
an infant-swaddle restraint means for enveloping an infant reclined in a supine position in an infant-receiving space so that shoulders, upper torso, legs, and feet of the infant are substantially covered to swaddle the infant, wherein the swaddle harness is coupled to the restraint means to inhibit movement of the infant-swaddle restraint means relative to the seat shell while the infant-swaddle restraint means is located on the seat shell,
wherein the infant-swaddle restraint means includes a backrest made of a pliable material to conform as needed to portions of the seat bottom and seat back in the basin formed in the seat shell,
wherein the infant-swaddle restraint means also includes a foot-and-leg blanket coupled to the backrest and arranged to cooperate with the backrest to form a top-opening bag sized to receive and cover at least the feet and legs of the infant swaddled in the infant-swaddle restraint means and arranged to open toward a head of an infant swaddled in the infant-swaddle restraint means,
wherein the infant-swaddle restraint means also includes a left shoulder wing separated from the foot-and-leg blanket and pivotably coupled to a left-side region of a middle panel portion of the backrest and a right shoulder wing separated from the foot-and-leg blanket and pivotably coupled to a right-side region of the middle panel of the backrest and the left and right shoulder wings are arranged to wrap around the shoulders and upper torso of an infant swaddled in the infant-swaddle restraint means while the feet and legs of the swaddled infant remain covered by the foot-and-leg blanket provided below the left and right shoulder wings and the infant-swaddle restraint means further includes a wing-and-blanket fastener configured to provide means for anchoring a free end of each of the left and right shoulder wings to lie in a stationary position relative to the backrest to retain the left and right shoulder wings in a closed infant-swaddling position covering the middle panel of the backrest, and the wing-and-blanket fastener comprises a waist-restraint belt coupled to an upper portion of a one-piece single blanket and to the backrest, a first wing-restraint belt coupled to a free end of the left shoulder wing and to the backrest and configured to tether the left shoulder wing to a right-side portion of the lower panel included in the backrest, and a second wing-restraint belt coupled to a free end of the right shoulder wing and configured to tether the right shoulder wing to a left-side portion of the lower panel included in the backrest to cause the left and right shoulder wings to crisscross and overlap one another.

16. A motion-inhibitor apparatus comprising
a juvenile seat includes a seat shell and a swaddle harness coupled to the seat shell,
  wherein the seat shell includes a seat bottom and a seat back extending upwardly from the seat bottom to form a basin in which infant-swaddle restraint means is located,
an infant-swaddle restraint means for enveloping an infant reclined in a supine position in an infant-receiving space so that shoulders, upper torso, legs, and feet of the infant are substantially covered to swaddle the infant, wherein the swaddle harness is coupled to the restraint means to inhibit movement of the infant-swaddle restraint means relative to the seat shell while the infant-swaddle restraint means is located on the seat shell,
  wherein the infant-swaddle restraint means includes a backrest made of a pliable material to conform as needed to portions of the seat bottom and seat back in the basin formed in the seat shell,
  wherein the infant-swaddle restraint means also includes a foot-and-leg blanket coupled to the backrest and arranged to cooperate with the backrest to form a top-opening bag sized to receive and cover at least the feet and legs of the infant swaddled in the infant-swaddle restraint means and arranged to open toward a head of an infant swaddled in the infant-swaddle restraint means,
wherein the foot-and-leg blanket includes a right blanket portion pivotably coupled to an outer edge of a lower right-side portion of the backrest, a left blanket portion pivotably coupled to an outer edge of a lower left-side portion of the backrest, and a center fastener configured to provide means for selectively coupling the right blanket portion to the left blanket portion to form the foot-and-leg blanket that cooperates with a companion lower panel included in the backrest to form the top-opening bag.

17. The motion-inhibitor apparatus of claim 16, wherein the infant-swaddle restraint means further includes a wing-and-blanket fastener configured to provide means for coupling the leg-and-foot blanket to each of the left and right shoulder wings to form an outer covering that cooperates with the backrest to form the infant-receiving space in the infant-swaddle restraint means.

18. The motion-inhibitor apparatus of claim 17, wherein the wing-and-blanket fastener comprises a left segment coupled to the left shoulder wing, a right segment coupled to the right shoulder wing, and a center segment coupled to the center fastener and configured to mate with the left and right segments.

19. A motion-inhibitor apparatus comprising
a juvenile seat includes a seat shell and a swaddle harness coupled to the seat shell.,
  wherein the seat shell includes a seat bottom and a seat back extending upwardly from the seat bottom to form a basin in which infant-swaddle restraint means is located,
an infant-swaddle restraint means for enveloping an infant reclined in a supine position in an infant-receiving space so that shoulders, upper torso, legs, and feet of the infant are substantially covered to swaddle the infant, wherein the swaddle harness is coupled to the restraint means to inhibit movement of the infant-swaddle restraint means relative to the seat shell while the infant-swaddle restraint means is located on the seat shell,
  wherein the infant-swaddle restraint means includes a backrest made of a pliable material to conform as needed to portions of the seat bottom and seat back in the basin formed in the seat shell,
wherein the infant-swaddle restraint means also includes a right blanket portion pivotably coupled to an outer edge of a lower right-side potion of the backrest, a left blanket portion pivotably coupled to an outer edge of a lower left-side portion of the backrest, and a center fastener configured to provide means for selectively coupling the right blanket portion to the left blanket portion to form a leg-and-foot blanket that cooperates with a companion lower panel included in the backrest to form a top-opening bag sized to receive and cover at least the feet and legs of the infant swaddled in the infant-swaddle restraint means.

20. The motion-inhibitor apparatus of claim 19, wherein the infant-swaddle restraint means also includes a left shoulder wing pivotably coupled to a left-side interior region of an upper panel portion of the backrest, a right shoulder wing pivotably coupled to a right-side interior region of the upper panel of the backrest, and a wing-and-blanket fastener configured to provide means for coupling the foot-and-leg blanket to each of the left and right wings to form an outer covering that cooperates with the backrest to form the infant-receiving space in the infant-swaddle restraint means and the left and right shoulder wings wrap around the shoulders and upper torso of an infant swaddled in the infant-swaddle restraint means.

21. A motion-inhibitor apparatus comprising
a juvenile seat includes a seat shell and a swaddle harness coupled to the seat shell,
  wherein the seat shell includes a seat bottom and a seat back extending upwardly from the seat bottom to form a basin in which infant-swaddle restraint means is located,
an infant-swaddle restraint means for enveloping an infant reclined in a supine position in an infant-receiving space so that shoulders, upper torso, legs, and feet of the infant are substantially covered to swaddle the infant, wherein the swaddle harness is coupled to the restraint means to inhibit movement of the infant-swaddle restraint means relative to the seat shell while the infant-swaddle restraint means is located on the seat shell,
  wherein the infant-swaddle restraint means includes a backrest made of a pliable material to conform as needed to portions of the seat bottom and seat back in the basin formed in the seat shell, wherein the infant-swaddle restraint means also includes a foot-and-leg blanket coupled to the backrest and arranged to cooperate with the backrest to form a top-opening bag sized to receive and cover at least the feet and legs of the infant swaddled in the infant-swaddle restraint means and arranged to open toward a head of an infant swaddled in the infant-swaddle restraint means, wherein the backrest includes a lower panel, an upper panel, and a middle panel arranged to interconnect the lower and upper panels, the upper panel is arranged to underlie a head of an infant restrained in the infant-swaddle restraint means, the blanket is coupled to a perimeter portion of the lower panel and a wrap is coupled to an interior portion of the middle panel, slots are formed in the upper panel to provide means for receiving shoulder straps of any existing passenger-restraint harness provided in a vehicle in which the juvenile seat is used, and the wrap is positioned to lie in a space provided between the blanket and the slots.

22. The motion-inhibitor apparatus of claim 21, wherein the blanket includes a left blanket portion, a right blanket portion, and a center fastener, the left blanket portion is coupled along a lower perimeter edge thereof to a left perimeter portion of the lower panel, the right blanket portion is coupled along a lower perimeter edge thereof to a right perimeter portion of the lower panel, and the center fastener is coupled to the companion inner perimeter edges of left and right blanket portions and is configured to cause those edges to mate to align left and right blanket portions in end-to-end relation to form the blanket.

\* \* \* \* \*